United States Patent [19]
Hawley et al.

[11] 3,984,039
[45] Oct. 5, 1976

[54] PRECISION-SURFACE WITH DYNAMICALLY-STIFF AIR FILM PROVIDED BY DEEP POOLS

[75] Inventors: Chris Hawley; Peter A. Stevenson, both of Boulder, Colo.

[73] Assignee: International Business Machines Corporation, Armonk, N.Y.

[22] Filed: Dec. 16, 1974

[21] Appl. No.: 533,409

[52] U.S. Cl. .............................. 226/97; 226/196; 308/DIG. 1
[51] Int. Cl.² ........................................ B65H 17/32
[58] Field of Search ................ 226/97, 7, 196, 197; 308/DIG. 1, DIG. 9, 108, 4 R

[56] References Cited
UNITED STATES PATENTS

| | | | |
|---|---|---|---|
| 2,908,495 | 10/1959 | Andrews et al. | 271/2.6 |
| 3,313,462 | 4/1967 | Smith, Jr. | 226/97 |
| 3,485,429 | 12/1969 | Hutzenlaub | 226/97 |
| 3,567,093 | 3/1971 | Johnson | 226/97 |
| 3,649,381 | 3/1972 | Mayhew | 226/97 |
| 3,761,002 | 9/1973 | Baumann et al. | 226/97 |

Primary Examiner—Allen N. Knowles
Attorney, Agent, or Firm—Homer Knearl

[57] ABSTRACT

A precision-surface is constructed to support magnetic tape on a dynamically-stiff air film above the surface. The precision-surface is achieved by using relatively thick stock material for the bearing. The bearing may be ground to the precise contour and dimensions for the desired tape path. A thin stiff air film between the bearing surface and the tape is provided by deep pools in the bearing surface. The bottom of each pool contains a single small hole in the order of 0.010 inch (0.254 mm.) in diameter for supplying air under pressure to the pool. The small holes are placed in the bottom of the pools preferably by using a thin foil with the holes etched therein and bonding the foil inside the rigid bearing so that the foil becomes the bottom of the pools. The total cross-sectional area of pools on the bearing surface is limited to a small percentage of the area of the bearing surface as the compressibility of the air in the pools can affect the stiffness of the air film.

11 Claims, 4 Drawing Figures

PRECISION-SURFACE WITH DYNAMICALLY-STIFF AIR FILM PROVIDED BY DEEP POOLS

BACKGROUND OF THE INVENTION

1. Field of the Invention

This invention relates to a precise bearing for tape in a magnetic tape recorder. More particularly, the invention relates to a precise bearing providing a thin, dynamically-stiff air bearing or air film between the bearing surface and the tape.

2. Review of Problem and Prior Art Solutions

In high density magnetic tape recording, it is desirable to have a tape path supported in a precise position and supported with a dynamically-stiff air film. The stiff air film makes the tape path relatively invariant to small variations in tension in the tape. If an air film is spongy or soft, then as the tape moves around a circular bearing, changes in tape tension would change the thickness of the air film and thus the tape path. As tape tension increases, the radius of the tape path would decrease. A dynamically-stiff air film, on the other hand, does not materially change its thickness with variations in tape tension.

To obtain a dynamically-stiff air film, the air film should be thin and rapidly change in pressure as tension in the tape causes the tape to press down on the film. This can be accomplished by using small holes to conduct air flow from a pressure chamber inside the bearing to the surface of the bearing. In addition, the pressure in the plenum inside the bearing should be much higher than the maximum pressure required to keep the tape off the surface of the bearing. In such a bearing structure the small holes providing the air to the surface of the bearing will keep the air flow small and provide large pressure drops that change rapidly with changes in air flow.

The rapid change in pressure can be seen by examining the effect on a circular bearing if the tension in the tape goes up causing the tape to push down on the air film. As the tape lowers in flying height over the bearing surface, the air flow decreases rapidly. As the air flow through the holes in the bearing surface decreases rapidly, the pressure in the air film rapidly increases closer to the pressure in the plenum supply. Thus a small change in flying height due to tension in the tape brings a rapid change in film pressure to balance the force pushing the tape down on the film. This rapid dynamic adjustment can be referred to as dynamic stiffness in the air film of the bearing.

To obtain a bearing having a dynamically-stiff air film characteristic, there are two known ways of constructing the bearing. One bearing uses a porous material. The small pores in the material serve as the air holes or passages for air under pressure inside the bearing to the film on the outside of the bearing. Materials that have been used include porous ceramics or porous metals such as brass or stainless steel. A difficulty with such bearings is that a precise-surface contour cannot be obtained with these bearings. To obtain a precise-surface requires a grinding operation or some other type of surface finishing operation. Trying to grind or surface finish a porous surface results in filling in the pores in the surface and thus destroying its porosity.

An alternate solution to obtaining a bearing surface with a precise contour, and having a capacity to generate a thin, dynamically-stiff air film, would be to use rigid material which could be ground to a fine precision-surface and thereafter drill small holes in the surface. However, putting small holes in a rigid thick material is not easily accomplished. As a practical matter for holes less than 0.025 inch (0.635 mm.) in diameter, a rule of thumb is that the small hole cannot be drilled any deeper than the diameter of the hole. Thus a hole with a 0.010 inch (0.254 mm.) diameter as a practical limit can only be placed in sheet stock 0.010 inch (0.254 mm.) thick. Accordingly, it is not practical to drill holes 0.010 inch (0.254 mm.) in diameter through thick stock material, for example 0.125 inch (3.175 mm.) thick.

The next possibility for fabricating a precise-bearing surface with small holes is to precisely machine a thick rigid bearing support with air channels therein. Then overlay the bearing with a thin foil having the proper size small holes to produce the thin stiff air film. The holes of course would be aligned with the air channels in the bearing support. A bearing constructed in this way would consist of rigid stock material approximately 0.125 inch (3.175 mm.) thick. The stock material would be ground to the precise contour desired, and channels would then be machined into its surface to provide an air pressure chamber underneath a foil. The foil with the small holes etched in it would then be bonded to the surface of the bearing. The foil would typically be 0.005 inch (0.127 mm.) thick and would have holes in it approximately 0.005 inch (0.127 mm.) in diameter.

The problem with such a structure is that the outside contour of the bearing cannot be precisely controlled because of the very thin nature of the foil. The thin foil is so flexible that when bonded to the rigid support bearing, especially in a heat bonding operation, the foil will dimple where the air channels are beneath the foil. Further, precise grinding of the foil thereafter is impossible because the foil is so thin. Thus, practically speaking, the concept of bonding a thin foil having small holes to a rigid precise bearing is not feasible because of the flexibility of the foil prevents the bearing from having a precise contour.

It is the object of this invention to provide a very precise rigid bearing having the capability of producing a thin air film with high dynamic stiffness so that magnetic tape passing over the bearing will have a very precise and dynamically stable tape path.

SUMMARY OF THE INVENTION

In accordance with this invention, the above object has been accomplished with a bearing made with thick walls in the range of 0.10 inch (0.254 mm.) to 0.25 inch (6.35 mm.) precisely machined to the desired dimensions and contour of the bearing. Relatively large holes are drilled through the bearing. These holes have a diameter approximately in the range of 0.12 inch (3.048 mm.) to 0.25 inch (6.35 mm.). The bottom of the holes are then covered with a foil having a small diameter hole in the order of 0.010 inch (0.254 mm.) in diameter.

A bearing constructed in this manner will have a precise curved outer surface, while at the same time having deep pool air bearings capable of producing a thin, dynamically-stiff air film between the curved outer surface and the tape. Pressure inside the bearing should be significantly higher than that necessary to maintain the air film between the tape and the bearing surface. The total cross-sectional area for the holes at the bottom of all the pools should be such as to restrict the air flow between the pressure plenum inside the bearing and the air film above the bearing. Then, as tension in the tape causes the height or thickness of the air film to change, the change in air flow will produce a rapid change in pressure in the air film to counteract the downward force of the tape. In this way dynamic stiffness of the air film between tape and bearing is achieved.

In addition, the cross-sectional area of the pools should remain less than 10% of the surface area of the bearing. This will prevent the compressibility of the air in the pools from softening the stiff air bearing.

The great advantage of our invention is that the structure provides a very precise bearing surface having the capability of producing a thin air film with dynamic stiffness while at the same time being relatively simple and cheap to manufacture. This is due to the fact that the manufacture of the precise surface has been decoupled from the manufacture of the foil controlling the dynamic stiffness of the air film. As a result, the cost of such an air bearing has been cut to a fraction of the cost of prior art air bearings. Further, the quality of the precise contour of the new air bearing is much greater than that of the prior art air bearings.

DETAILED DESCRIPTION

Figure 1:
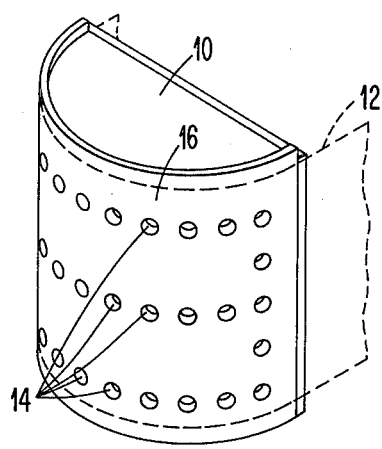
FIG. 1 shows a 180° circular bearing in perspective with tape in phantom wrapped about the bearing.

Perspective view of the bearing 10 with magnetic tape 12 shown in phantom illustrates typical use of the bearing 10. While bearing 10 might be used with various widths of tapes and might be adjusted in size depending on tape width, the bearing is particularly useful in supporting wide magnetic tape. Wide magnetic tape typically varies from 1 inch (25.4 mm.) in width to 3 inches (76.2 mm.) in width and most often is used in the rotating-head tape-recording technology. For example, if tape 12 is approximately 2.7 inches (68.58 mm.) in width, bearing 10 would have a width of approximately 3 inches (76.2 mm.) and a radius of 1.5 inches (38.1 mm.).

The deep pools 14 in the surface 16 of bearing 10 would typically range in the order of 0.12 inch (3.048 mm.) to 0.25 inch (6.35 mm.) in diameter. As depicted in FIG. 1, the pools are approximately 0.160 inch (4.06 mm.) in diameter. The pools may be placed in any number of patterns on the bearing surface. As shown in FIG. 1, there is a row of pools near each edge of the tape 12, a row of pools down the center of the tape 12, and a row of pools where the tape enters and exits the bearing 10. In the view of the bearing in FIG. 1 the row where the tape enters the bearing cannot be seen. In each of these rows, the center-to-center distance between pools is approximately 0.4 inch (10.2 mm.).

Alternative hole patterns might consist of extra pools where the tape enters and exits the bearing 10. Also, the row of holes down the length of the center of the tape path might be replaced by a plurality of rows of pools spaced across the surface 16 parallel to the axis of the cylinder. These rows might typically be spaced about 1.5 inches (38.1 mm.) apart around the circumference of the bearing surface 16. For the bearing 10 shown in FIG. 1, having a radius of 1.5 inches, separation of 1.5 inches would place a row of pools every ⅛ of the distance around the circumference of the surface 16 from the rows of pools at tape entry and tape exit. It will be appreciated by one skilled in the art that a multiplicity of patterns might be chosen, and that there is nothing critical in the particular pattern chosen.

One factor in designing the spacing between pools in a given row of pools is that it is desirable to achieve a uniform support of the tape rather than a support of the tape that tends to be discrete from pool to pool. As stated above, a center-to-center distance of 0.4 inch between pools in a row with pools approximately 0.160 inch in diameter is the preferred embodiment of the bearing 10 in FIG. 1.

Figure 2:
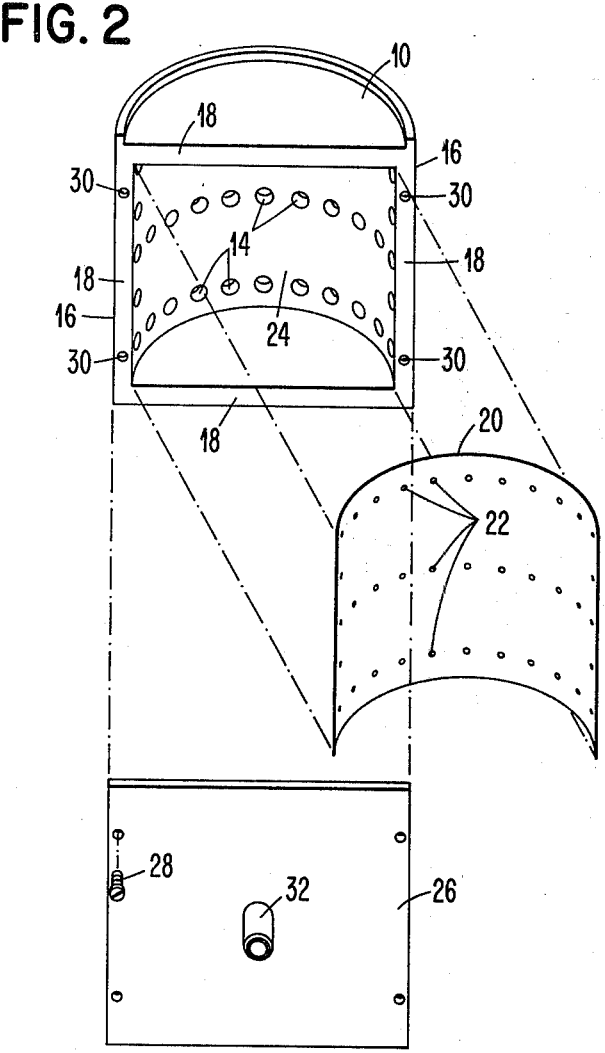
FIG. 2 is an exploded view of the bearing of FIG. 1 showing the inner foil containing the small holes that provide the limited air flow and large pressure drop between the inner air pressure plenum and the air film at the surface of the bearing.

Now referring to FIG. 2, the structure of the bearing 10 is shown in an exploded view. Bearing 10 is preferably a cast aluminum bearing. The tape support surface 16 may be ground to the precise contour and dimension desired for the bearing 10. The grinding or surface finishing of the tape support surface provides a precise reference contour for the tape path. All four walls 18 of the bearing 10 have a thickness in the range of 0.10 inch to 0.25 inch (2.54 mm. to 6.35 mm.). With walls of this thickness, the grinding of the surface 16 in bearing 10 to a precise dimension and contour is no problem, and is in fact one of the least costly ways to achieve a precise bearing surface.

After the bearing surface 16 has been surface finished to a range of 15 to 40 microinches (3.8 × $10^{-4}$mm. to 10.2 × $10^{-4}$mm.) center line average for surface fluctuations, the pools are formed in the surface 16 by drilling large holes through the bearing surface 16. As shown in FIG. 2 looking through the back of the bearing 10, the holes that form pools 14 are shown.

To form the bottom of the pools, foil 20 with tiny air flow holes 22 etched therein is placed inside the bearing 10. Foil 20 would be bonded to the inside surface 24 of the bearing 10 usually with a heat curing process. Because of the rigidity of the bearing 10, a heat curing process can be used without concern for changing the precision contour of the surface 16 of the bearing. Deformity in foil 20 is no concern as the foil is at the bottom of the pools.

The foil 20 is quite flexible as it will be about the same thickness as the diameter of the small pin holes 22. Holes 22 are preferably 0.01 inch (0.254 mm.) in diameter. Holes 22 may be drilled or etched in foil 20. The size of the pin holes 22 is not critical; however, they must be small enough so that they provide a significant restriction to the flow of air from inside the bearing 10 to the surface 16 of the bearing 10.

As discussed under "Background of the Invention" for a dynamically-stiff thin air film between the bearing surface and the tape, the air flow to the bearing surface should be restricted. Further, there should be a significant pressure drop from the plenum inside the bearing to the air film on the surface of the bearing. Under these circumstances, a change in the flying height of the tape, i.e. the thickness of the air film, markedly changes the flow of air out the edges of the tape 12. Because the holes 22 are tiny, this change in air flow out from under the tape results in a large change of air flow through the holes 22. The large change in air flow through the holes 22 brings an associated rapid change in pressure drop from the pressure in the plenum inside the bearing to the pressure in the film at the surface of the bearing. Thus, changes in air film thickness bring rapid changes in air film pressure, making the thin air film dynamically stiff.

To complete the structure of the bearing, a backplate 26 is bolted to the back of the bearing 10 with screws 28 (one shown) engaging threaded holes 30. Backplate 26 contains a nipple 32 to which an air pressure hose may be attached to pressurize the inside hollow chamber of the bearing 10. Typical air pressure inside the bearing 10 is 20 inches of water (508 kilograms per square meter). Typical film thicknesses or flying height of the tape above the surface of the bearing is $2.8 \times 10^{-3}$ inches ($7.1 \times 10^{-2}$ millimeters).

Figure 3B:
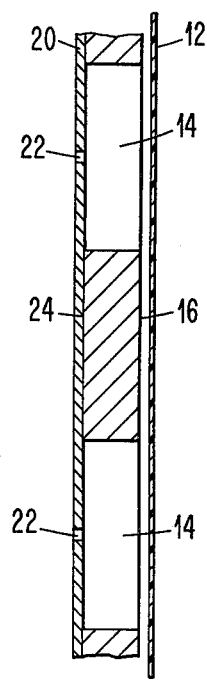
FIG. 3B shows the cross-section of the inventive bearing with its thick outer bearing surface having large pools whose air flow is controlled by the pin hole in the bottom of the pool.
Figure 3A:
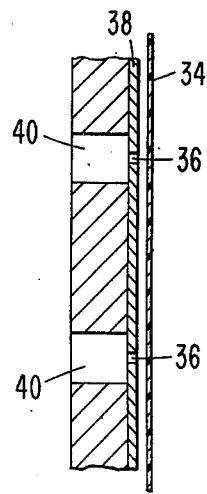
FIG. 3A is a cross-section of a prior art bearing for producing a dynamically-stiff air film between tape and bearing.

Referring now to FIGS. 3A and 3B, a cross-section across the width of the bearing along a portion of a row of air holes is shown in FIGS. 3A and 3B. In FIG. 3A the holes are at the surface of the bearing as in the prior art, whereas in FIG. 3B the holes are at the bottom of the deep pools. Notice that the edge-to-edge separation between the holes 36 in FIG. 3A and the edges of the pools 14 in FIG. 3B are the same. Thus for the same uniform support of tape 12 and tape 34, fewer pools 14 than holes 36 are needed.

For the same flying height of approximately $2.8 \times 10^{-3}$ inches, the small holes 22 should have a total cross-sectional area for all holes 22 equivalent to the total cross-sectional area of all holes 36. Stated another way, the quantity of air flow through the holes 22 and 36 for the entire surface of the bearing should be the same. Holes 36 are less than 5 mils (0.127 mm.) in diameter. Since there are fewer pools 14 than holes 36, and thus fewer holes 22 than holes 36, the size of the holes 22 is larger than holes 36 and is usually in the order of 10 mils (0.254 mm.).

As discussed earlier, one problem with the bearing structure in FIG. 3A is that the very thin foil 38 less than 0.005 inch (0.127 mm.) thick is not supported by the larger hole 40 underneath the foil 38. Thus, during the bonding process, the foil 38 tends to buckle or dimple at the hole 40, destroying the precise contour of the finished bearing.

In FIG. 3B on the other hand, the precise contour of the bearing is not affected by bonding the foil 20 to the inside surface 24 of the bearing. The outside surface 16 remains at the precise contour ground into the bearing.

There are a few considerations in determining the size and depth of the pools 14. As mentioned before, the separation between the edge of the pools 14 in FIG. 3B should be no greater than the separation between the edges of the holes 36 in FIG. 3A. This distance is a matter of choice to achieve uniform support of the tape so that the tape is not merely supported at discrete air bearing points, but instead has a uniform air film all along the bearing surface.

In addition, the cross-sectional area of the pools 14 should be a small percentage of the total surface area of the bearing surface 16. If this is not true, then the compressibility of the air in the pools will become a factor in the dynamic-stiffness of the air film supporting the tape 12. Also, the depth of the pools should be sufficient so that the jet of air coming through the tiny holes 22 does not dimple the tape 12. As the same time, the depth of the pools should not be so great as to provide a large column of air making the compressibility of the air a significant factor in the stiffness of the air film under the tape 12 in the area of the pools 14. Typically, the ratio of the depth of the pool 14 to the diameter of the pin hole 22 should be 10 to 1.

Tests on 180° circular bearings built in accordance with the structure of FIG. 3A and in accordance with the structure of FIG. 3B have shown very slight differences in dynamic stiffness of the air film. In fact, the dynamic stiffness of the deep pool bearing has been in order of 96–97% of the dynamic stiffness of the air film provided by the bearing in FIG. 3A. This very slight reduction in dynamic stiffness of the air film is more than compensated for by the precision surface that may be placed on the bearing constructed in accordance with FIG. 3B. Further, the manufacture of the structure shown in FIGS. 1, 2 and 3B is much less costly than the prior art structure of the bearing surface in FIG. 3A.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for supporting a magnetic tape along a precise curved path with a dynamically stiff air film comprising:
    a rigid bearing having walls thick enough to maintain the rigidity of the bearing;
    the curved outer surface of said bearing being surface finished to the precise reference contour desired for the path of tape supported by the bearing;
    deep pools in said curved outer surface in a predetermined pattern for providing the air film between said precise curved outer surface and the tape;
    said pools being deep enough to appear as a uniform pool of air pressure, and the total cross-sectional area of all of said pools, measured at the bearing surface, being substantially 10% or less of the surface area of said curved outer surface of the bearing so that the compressibility of the air in the pools does not substantially affect the dynamic stiffness of the air film;
    an air pressure supply inside the bearing for supplying air to said deep pools;
    a thin foil, having small holes formed therein being bonded to the inside wall of said bearing for forming the bottoms of said deep pools so that each of said deep pools is thereby connected to said pressure supply by a small hole in said thin foil;
    whereby air flow to said deep pools from said pressure supply is restricted so that changes in air flow cause rapid changes in air pressure in the air film the said tape and said curved outer surface and thereby make said air film dynamically stiff.

2. The apparatus of claim 1 wherein said deep pools are formed by drilling a relatively large hole of diameter in excess of tenths of an inch through said curved outer surface into said pressure supply inside the bearing, and then bonding said thin foil to the inside wall of the bearing so that a small hole in said thin foil is aligned with the bottom of each deep pool.

3. The apparatus of claim 2 wherein:

said rigid bearing has walls whose thickness ranges between 0.10 and 0.25 inch;

said large holes forming said pools range in diameter from 0.12 inch to 0.25 inch;

said small holes in the foil in the bottom of the pools are in the range of 0.003 inch to 0.020 inch in diameter.

4. The apparatus of claim 3 wherein the curved outer surface is surface finished to a precise contour with surface fluctuations within a range of 15 to 40 microinches center line average.

5. In a bearing for supporting magnetic tape with a dynamically stiff air film along a curved path, said bearing having an air pressure supply inside the bearing and a curved rigid tape support surface through which air is forced by that supply to generate the air film between the tape and the tape support surface, improved apparatus for generating the dynamically stiff air film comprising:

the tape support surface of the bearing being finished to a precise contour;

a pattern of relatively large deep holes in said tape support surface filled with air at air film pressure to form the air film between the tape and the tape support surface;

the total cross-sectional area of said air filled holes, measured in the tape support surface, being substantially 10% or less of the total area of the tape support surface so that the compressibility of the air does not significantly affect the dynamic stiffness of the air film;

flow restricting means including;

a foil at the bottom of said large, deep holes;

said foil having pin holes etched therein for restricting the flow rate from the air pressure supply inside the bearing to said large, deep holes;

whereby said flow restricting means produce rapid changes in air film pressure in proportion to changes in air flow in the air film, thereby imparting dynamic stiffness to the air film.

6. The apparatus of claim 5 wherein there is a ratio of at least ten to one between the depth of the large holes and the diameter of the pin hole in the foil at the bottom of each large hole.

7. The apparatus of claim 6 wherein said large diameter holes are approximately 0.160 inch in diameter and said pin holes etched in the foil are approximately 0.01 inch in diameter and the depth of the large hole from the tape support surface to the foil is approximately 0.120 inch.

8. A bearing for supporting magnetic tape with a dynamically-stiff air film comprising:

the body of the bearing cast from a hard material and having a hollow inner chamber with outer walls thick enough to remain rigid during heating or machining operations on the bearing;

the face of the bearing being ground to a precise curvature to provide a reference for the path of the tape;

holes drilled through the face of the bearing to the hollow chamber in a predetermined pattern, the diameter of the holes and their separation being selected so that, when the holes are pressurized by air under pressure in the hollow chamber, an air film will support the tape above the face of the bearing at an air film pressure uniformly distributed across the face of the bearing;

a foil with tiny holes, said foil being bonded to the inner wall of the face of the bearing, said holes in said foil controlling air flow from the hollow chamber to the holes drilled in the face;

said holes in the foil producing a significant pressure drop between the hollow chamber and the air film, with the pressure drop changing rapidly with changes in air flow in the film, thereby imparting dynamic stiffness to the air film.

9. The bearing of claim 8 wherein the face of the bearing is ground to a predetermined curvature for a reference for the path of the tape, said curvature being substantially uniform within surface fluctuations of 15 to 40 microinches center line average.

10. The apparatus of claim 8 wherein:

the walls of the body of the bearing have a thickness in the range of 0.10 inch to 0.25 inch;

said holes drilled through the face of the bearing have a diameter in the range of 0.12 inch to 0.25 inch;

said foil and said tiny holes etched in said foil have a thickness and diameter respectively of approximately 0.010 inch.

11. The apparatus of claim 8 wherein:

the total cross-sectional area of all holes drilled through the face of the bearing is less than ten percent of the total surface area of the face of the bearing;

the ratio of the depth of the large holes drilled in the face of the bearing to the diameter of the tiny holes etched in the foil is in excess of 10 to 1.

* * * * *